(12) United States Patent
Modarressi et al.

(10) Patent No.: US 7,929,677 B2
(45) Date of Patent: Apr. 19, 2011

(54) METHODS OF EMULATING REMOTE TELEPHONES AT A CLIENT DEVICE USING PROFILES OF THE REMOTE TELEPHONES AND RELATED SYSTEMS AND COMPUTER PROGRAM PRODUCTS

(75) Inventors: Abdi Modarressi, Lawrenceville, GA (US); Cathy Mousavi, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1191 days.

(21) Appl. No.: 11/599,509

(22) Filed: Nov. 14, 2006

(65) Prior Publication Data

US 2008/0112556 A1    May 15, 2008

(51) Int. Cl.
    *H04M 3/42*    (2006.01)
(52) U.S. Cl. .................................. 379/201.12
(58) Field of Classification Search ............ 379/67.1, 379/93.25, 201.12
    See application file for complete search history.

(56) References Cited

U.S. PATENT DOCUMENTS

| | | | |
|---|---|---|---|
| 4,640,986 | A | 2/1987 | Yotsutani et al. |
| 5,148,159 | A | 9/1992 | Clark et al. |
| 5,517,554 | A | 5/1996 | Mitchell et al. |
| 5,884,193 | A | 3/1999 | Kaplan |
| 5,944,533 | A | 8/1999 | Wood |
| 6,195,568 | B1 | 2/2001 | Irvin |
| 6,456,706 | B1 | 9/2002 | Blood et al. |
| 6,571,256 | B1 | 5/2003 | Dorian et al. |
| 6,920,326 | B2 | 7/2005 | Agarwal et al. |
| 2003/0081742 | A1* | 5/2003 | Czyszczewski et al. ... 379/93.03 |
| 2003/0139192 | A1 | 7/2003 | Chmaytelli et al. |
| 2003/0220093 | A1 | 11/2003 | Fellenstein et al. |
| 2004/0082322 | A1 | 4/2004 | Tani |
| 2004/0203601 | A1 | 10/2004 | Morriss et al. |
| 2004/0209595 | A1 | 10/2004 | Bekanich |
| 2006/0146792 | A1 | 7/2006 | Ramachandran et al. |
| 2006/0187900 | A1 | 8/2006 | Akbar |
| 2006/0211412 | A1 | 9/2006 | Vance |
| 2006/0229090 | A1* | 10/2006 | LaDue ........................ 455/507 |
| 2009/0082016 | A1* | 3/2009 | Bertagnole et al. .......... 455/433 |

FOREIGN PATENT DOCUMENTS

| | | |
|---|---|---|
| FR | 2824219 | 10/2002 |
| GB | 2306120 | 4/1997 |
| WO | WO 92/16078 | 9/1992 |
| WO | WO 2004/077797 | 9/2004 |

OTHER PUBLICATIONS

Hegarty "Personal Identify Password System", Motorola Technical Developments 39:75-76 (1999).

* cited by examiner

*Primary Examiner* — Creighton Smith
(74) *Attorney, Agent, or Firm* — Myers Bigel Sibley & Sajovec (57) ABSTRACT

A method of emulating a remote telephone at a client device may include accepting identification of the remote telephone at the client device and transmitting a request for a profile of the remote telephone. The profile of the remote telephone may be received, and after receiving the profile, the client device may be configured according to the profile of the remote telephone. After configuring the client device according to the profile of the remote telephone, a telephone communication addressed to the remote telephone may be received at the client device. Related systems and computer program products are also discussed.

17 Claims, 3 Drawing Sheets

METHODS OF EMULATING REMOTE TELEPHONES AT A CLIENT DEVICE USING PROFILES OF THE REMOTE TELEPHONES AND RELATED SYSTEMS AND COMPUTER PROGRAM PRODUCTS

FIELD OF THE INVENTION

The present invention generally relates to the field of communications, and more particularly to emulation of telephones and related systems and computer program products.

BACKGROUND

Internet Protocol (IP) telephone communications systems and methods are known as discussed, for example, in: U.S. Patent Publication No. 2006/0146792 entitled "Voice Over IP (VOIP) Network Infrastructure Components And Method"; and U.S. Patent Publication No. 2006/0187900 entitled "Method And System For Providing Private Virtual Secure Voice Over Internet Protocol Communications". The disclosures of each of the above referenced patent publications is hereby incorporated herein in its entirety by reference.

As discussed in U.S. Patent Publication No. 2006/0146792, for example, voice telecommunications have traditionally been conducted via dedicated telephone networks utilizing telephone switching offices and either wired or wireless connections for transmitting the voice signal between the users' telephones. Such telecommunications, which use the Public Switched Telephone Network (PSTN), may be referred to as circuit switched communications. Voice over Internet Protocol (VoIP) provides an alternative voice telecommunication system which use discrete packets of digitized voice information to transmit the voice signals. The packets are transmitted over the public Internet and/or within intranets.

SUMMARY

According to some embodiments of the present invention, methods of emulating a remote telephone at a client device may include identifying the remote telephone at the client device, and transmitting a request for a profile of the remote telephone. The profile of the remote telephone may be received, and after receiving the profile, the client device may be configured according to the profile of the remote telephone. After configuring the client device according to the profile of the remote telephone, a telephone communication addressed to the remote telephone may be received at the client device.

The profile of the remote telephone may include a telephone number of the remote telephone. In addition, the profile of the remote telephone may include at least one of a call history log for the remote telephone, contact information for the remote telephone, a voice mail association for the remote telephone, and/or billing information for the remote telephone.

Transmitting the request for a profile may include transmitting the request over a data network, and receiving the profile may include receiving the data profile over the data network. More particularly, the data network may include an Internet Protocol (IP) connectivity network. After receiving the profile and before and before receiving the telephone communication addressed to the remote telephone, the client device may also register with a telephone network switch to receive and transmit calls according to the profile of the remote telephone. Registering with the telephone network switch may include registering with the telephone network switch over the data network, and the telephone network switch may be an Internet Protocol Multimedia Subsystem (IMS) telephone network switch. After registering with the telephone network switch, the client device may also transmit a request to terminate registration with the telephone network switch.

After receiving the profile, revised profile information for the profile of the remote telephone may be transmitted with the revised profile information being different than profile information received with the profile of the remote telephone. More particularly, the revised profile information may include at least one of a revised call history log, revised contact information, a revised voice mail association, and/or revised billing information.

In addition, the remote telephone may be a first remote telephone, and after receiving the telephone communication addressed to the first remote telephone, the client device may accept identification of a second remote telephone with the first and second remote telephones being different. A request for a second profile of the second remote telephone may be transmitted, and the second profile of the second remote telephone may be received. After receiving the second profile, the client device may be configured according to the second profile of the second remote telephone. After configuring the client device according to the second profile of the second remote telephone, a second telephone communication may be received at the client device with the second telephone communication being addressed to the second remote telephone.

According to other embodiments of the present invention, a method of maintaining a profile for a telephone to support emulation of the telephone at a client device remote from the telephone may include providing the profile for the telephone at a database separate from the telephone and separate from the client device. The profile for the telephone may be updated at the database responsive to activity at the telephone. A request for the profile for the telephone may be received from the client device, and after receiving the request, the profile for the telephone may be transmitted to the client device. After transmitting the profile for the telephone to the client device, the profile for the telephone may be updated at the database responsive to activity at the client device.

The profile of the remote telephone may include a telephone number of the telephone. More particularly, the profile of the telephone may include at least one of a call history log for the telephone, contact information for the telephone, a voice mail association for the telephone, and/or billing information for the telephone. Updating the profile for the telephone at the database responsive to activity at the client device may include receiving revised profile information from the client device. Moreover, the revised profile information may include at least one of a revised call history log, revised contact information, a revised voice mail association, and/or revised billing information.

Receiving the request for the profile may include receiving the request over a data network, and transmitting the profile may include transmitting the data profile over the data network. More particularly, the data network may include an Internet Protocol (IP) connectivity network. In addition, updating the profile for the telephone at the database responsive to activity at the telephone may include updating the profile for the telephone at the database responsive to activity at the telephone before and after updating the profile for the telephone at the database responsive to activity at the client device.

According to some other embodiments of the present invention, a computer program product may be provided to emulate a remote telephone at a client device, with the computer program product including a computer readable medium having computer readable program code embodied therein. The computer readable program code may include computer readable program code configured to accept identification of the remote telephone at the client device and to transmit a request for a profile of the remote telephone. The computer readable program code may further include computer readable program code configured to receive the profile of the remote telephone, and to configure the client device according to the profile of the remote telephone after receiving the profile. The computer readable program code may also include computer readable program code configured to receive a telephone communication addressed to the remote telephone at the client device after configuring the client device according to the profile of the remote telephone.

According to still other embodiments of the present invention, a client device may include a processor coupled to a user interface, coupled to a transmitter, and coupled to a receiver. The user interface may be configured to accept identification of the remote telephone at the client device, and the transmitter may be configured to transmit a request for a profile of the remote telephone. The receiver may be configured to receive the profile of the remote telephone, and the processor may be configured to configure the client device according to the profile of the remote telephone after receiving the profile, and to process a telephone communication addressed to the remote telephone at the client device after configuring the client device according to the profile of the remote telephone.

According to yet other embodiments of the present invention, a computer program product may be provided to maintain a profile for a telephone to support emulation of the telephone at a client device remote from the telephone, with the computer program product including a computer readable medium having computer readable program code embodied therein. The computer readable program code may include computer readable program code configured to provide the profile for the telephone at a database separate from the telephone and separate from the client device, and to update the profile for the telephone at the database responsive to activity at the telephone. The computer readable program code may include computer readable program code configured to receive a request for the profile for the telephone from the client device, and after receiving the request, to transmit the profile for the telephone to the client device. The computer readable program code may further include computer readable program code configured to update the profile for the telephone at the database responsive to activity at the client device after transmitting the profile for the telephone to the client device.

According to additional embodiments of the present invention, a database may be provided to maintain a profile for a telephone to support emulation of the telephone at a client device remote from the telephone. The database may include a processor coupled to a memory, coupled to a transmitter, and coupled to a receiver. The memory may be configured to store the profile for the telephone at a database, and the memory may be separate from the telephone and separate from the client device. The processor may be configured to update the profile for the telephone in the memory responsive to activity at the telephone, and the receiver may be configured to receive a request for the profile for the telephone from the client device. After receiving the request, the transmitter may be configured to transmit the profile for the telephone to the client device. After transmitting the profile for the telephone to the client device, the processor may be configured to update the profile for the telephone in the memory responsive to activity at the client device.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, apparatus, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, or semiconductor system, apparatus, device, or other tangible medium. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or operational illustrations of methods, apparatus, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Individuals may now be faced with situations in which availability of customized sets of capabilities may be desired so that a mobile user can invoke his/her network and/or web services at a specific time and/or in a specific place in a way that is consistent with particular aspects of his/her lifestyle and/or preferences at the time. In some cases, the user may carry multiple devices (such as a work cell phone/PDA, a personal cell phone/PDA, etc.), and/or by the user physically using a device matched to his/her current needs at a particular location (such as, a wire-line family/personal phone at home, a wire-line work-at-home phone, an office phone, etc.). Technology is currently evolving in a direction such that a mobile user may be able to carry one or two powerful devices (such as a dual mode phone/PDA and a laptop, for example) that may potentially satisfy most of his/her needs in a mobile context. Network based applications may thus be developed to take advantage of such soft and/or hard client capabilities. Virtual Private Networks (VPNs) and remote desktop capabilities, for example, have been developed in the context of data access.

As used herein, the term "profile" (also referred to as a "persona") is defined as a collection of data and/or behavior characteristics that encompass a particular mode of operation chosen and defined by a user. For example, a user may have a "work profile" and a "home profile". A work profile may include capabilities and/or data associated with the user's work phone. Such data and/or capabilities may include (but are not limited to) a call history, an address book, speed dialing codes, a forwarding number, billing arrangements, voicemail, etc. Similar data and/or capabilities may be provided for a user's home profile. The user may have any number of profiles, such as, a vacation profile, a community profile, a home profile, a work profile, etc.

According to embodiments of the present invention, a user's client device (such as a soft Internet Protocol Multimedia Subsystem (IMS) phone client application running on a computing device such as a personal computer, laptop computer, handheld computer, PDA (personal digital assistant), mobile telephone, etc.) may be configured to operate according to one of a plurality of profiles of different remote telephones associated with the user. The client device may thus be configured according to a profile of a remote telephone associated with the user to provide functionality of the remote telephone.

For example, when the user's client device is configured according to a work profile, the client device (running on the user's computing device) may be configured to emulate (i.e., provide functionality of) the user's work phone located at a remote work location. Thus, the user's client device may be configured with a telephone number, a call history log, contact information (such as an address book, speed dialing codes, etc.), a voice mail association, billing information, and/or other similar data from the profile of the user's work telephone. Once configured with this data, the client device may register with a network switch (such as an IMS network switch) as the user's work phone using the work phone number. The client device may then act as the user's work phone with the network switch routing telephone calls directed to the user's work telephone number to the client device and with the client device placing calls through the network switch as the user's work phone.

When configured with the profile of the user's work phone, for example, operation of the client device as the user's work phone may be billed according to the profile of the user's work phone. A long distance call placed from the client device when configured according to the user's work profile, for example, may be billed to the account for the user's work phone. Moreover, any voice mail for the user's work phone may be accessible from the user's client device while the user's client device is configured with the profile of the user's work phone.

Similarly, operation of the client device as the user's home phone may be billed according to the profile of the user's home phone when configured with the profile of the user's home phone. A long distance call placed from the client device when configured according to the user's home profile, for example, may be billed to the account for the user's home phone. Moreover, any voice mail for the user's home phone may be accessible from the user's client device while the user's client device is configured with the profile of the user's home phone. The information associated with each profile may reside in a database within a telecommunications service provider's information technology (IT) infrastructure to provide accessibility to the user's client device.

Figure 1:
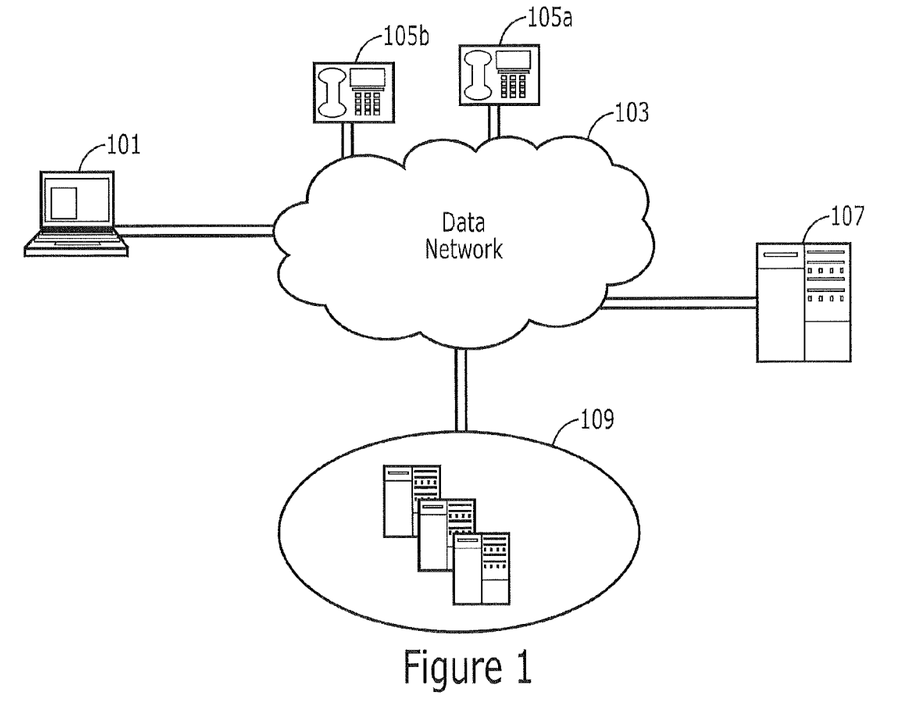
FIG. 1 is a diagram illustrating communications systems and methods providing emulation of a remote telephones at client devices according to some embodiments of the present invention.

FIG. 1 is a block diagram illustrating interconnections of network elements according to some embodiments of the present invention. As shown in FIG. 1, for example, a user's client device 101 may be coupled to a data network 103, and the user's client device 101 may be configured to emulate one of a plurality of telephones 105a-b associated with the user and also coupled to the data network 103. A profile for each of the telephones 105a-b may be maintained at a database(s) 107 (such as a business process database), and the database(s) 107 may be maintained by a telecommunications service provider remote from the telephones 105a-b and remote from the client device 101. In addition, a network switch 109 (such as an IMS telecommunications network switch operated by the telecommunications service provider) may be coupled to the data network 103. The network switch 109 may be configured to route telephone communications to/from the telephones 105a-b and/or the user's client device 101. While network elements such as firewalls, proxies, and/or gateways are not shown in FIG. 1, one or more of these and/or other network elements may be included as will be understood by those having skill in the art. Moreover, while the network switch 109 and the database 107 are shown as being separate, some or all functionalities thereof may be performed at a same location using the same equipment.

The user's client device 101, for example, may include a software phone client application running on a computing device (such as a personal computer, laptop computer, PDA, mobile telephone, etc.), and each of the telephones 105a-b may be a Session Initiated Protocol (SIP) phone (also referred to as a Voice-Over-Internet Protocol phone or a VoIP phone). The phone 105a may be the user's work phone, the phone 105b may be the user's home phone, and the phones 105a-b may be remote from each other and remote from the client device 101. While work and home phones are discussed by way of example, other phones (such as a second home phone, a mobile phone, an automobile phone, etc.) may be used according to embodiments of the present invention. Moreover, the database 107 and network switch 109 may support more than two telephones associated with one user, and the database and network switch may support telephones associated with many users.

More particularly, the data network 103 may include an Internet Protocol (IP) connectivity network. As shown in FIG. 1, functionality of the database 107 and the network switch 109 may be provided at different locations (i.e., provided remotely). According to other embodiments of the present invention, functionality of the data base 107 and the network switch 109 (and/or portions thereof) may be provided at a same location. The user's client device 101 may include an IMS soft client application running on a computing device such as a personal computer, a laptop computer, a handheld computer, a PDA, and/or a mobile telephone. The user's client device 101, for example, may include a computing device running a soft phone application such as that provided by eyeBeam software.

More particularly, the user's client device 101 may be configured to present a choice of profiles for one or more remote telephones (such as phones 105a-b) using a graphical interface such as an interface of a browser application and/or an interface of another application such as a BellSouth Personal Desktop (BPD) application. Each profile identified by the user's client device 101 may correspond to a distinct profile for a respective phone 105a-b stored in the database 107 provided by the telecommunications service provider's network. The network hosted profile(s) at database 107 may be periodically updated (e.g., synchronized) with the respective profile information from the respective phone 105a and/or 105b. A period between profile updates and/or synchronizations may be a configurable parameter for each of the phones 105a-b.

According to some embodiments of the present invention, a user of the client device 101 may select at the client device 101 identification of one of the plurality of phones 105a-b that is to be emulated. A Web-based soft phone application running on the client device 101 may then transmit a request over the data network 103 to the database 107 requesting the profile associated with the identified phone. The database 107 may then transmit the profile over the data network 103 for the identified phone to the client device 101, and the client device 101 may configure itself to emulate the identified phone using the profile received from the database 107. The client device 101 can then register over the data network 103 with the network switch 109 using an SIP/IMS identity and/or telephone number included in the profile for the phone being emulated. The client device 101 can thus be configured make and receive calls using the profile of the emulated phone, and the network switch 109 can be configured to route calls to/from the client device 101 that would otherwise be routed to/from the phone being emulated by the client device 101. Operations of the client device 101, the database 107, and the network switch 109 according to some embodiments of the present invention will now be discussed in greater detail below with respect to the flowcharts of FIGS. 2-4.

Figure 2:
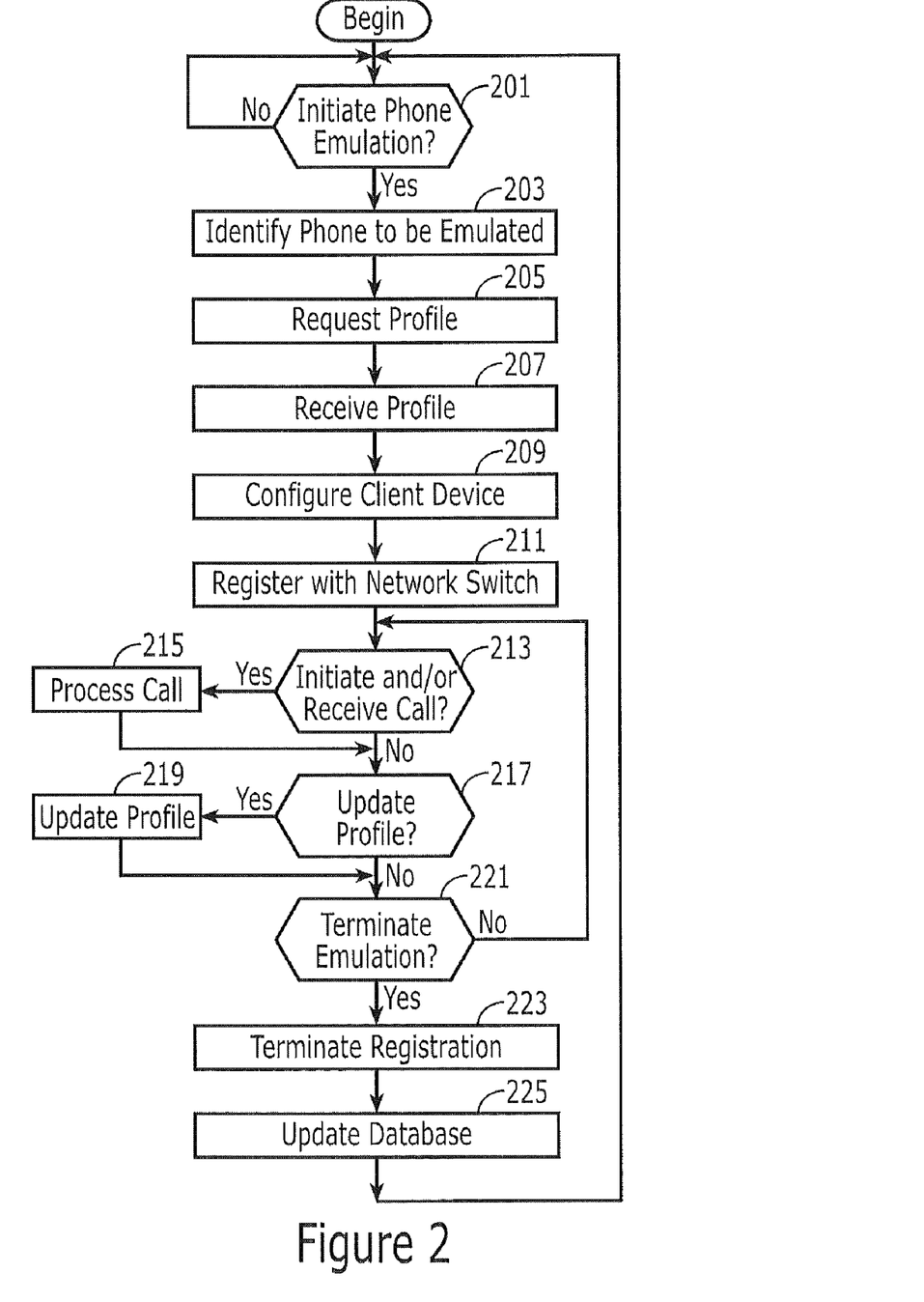
FIGS. 2-4 are flow charts illustrating operations of elements of communications systems of FIG. 1 according to some embodiments of the present invention.

The user's client device 101 may include a soft phone application running on a computing device as discussed above. As shown in FIG. 2, the client device 101 may wait until some action is taken to initiate phone emulation at block 201 before emulating a phone. Emulation, for example, may be initiated by a user launching a soft phone application at the client device 101, by a user turning on the client device 101, by a user activating a designated input (such as a designated key), etc. Once initiation has occurred at block 201, the phone to be emulated may be identified at block 203. If the client device 101 is configured to emulate one of a plurality of remote phones (such as phones 105a-b), a user of the client device 101 may be required to select one of the plurality of remote phones, for example, using a graphical user interface. If the client device 101 is configured to emulate only one remote phone, initiation of emulation (such as by launching the soft phone application) may be sufficient identification of the phone to be emulated.

The client device 101 may then transmit a request for the profile of the remote phone to be emulated over the data network 103 to the database 107 at block 205. Responsive to receiving the request from the client device 101 at the database 107, the database 107 may transmit the profile of the remote phone to be emulated over the data network 103 to the client device 101, and the client device 101 may receive the profile at block 207. Before transmitting the profile, the database 107 may require validation of the client device 101 (for example, using a key, password, etc.) to provide that the profile is not improperly distributed. Operations of the database relating to transmission of the profile will be discussed in greater detail below with respect to FIG. 3.

After receiving the profile of the remote phone to be emulated, the client device 101 may be configured according to the profile of the remote phone received from the database 107 at block 209, and the client device 101 may register with the network switch 109 at block 211. Once registration with the network switch 109 has occurred, the network switch 109 may route calls relating to the remote phone being emulated to/from the client device 101 as discussed in greater detail below with respect to FIG. 4. Before routing calls to/from the client device 101 emulating a remote phone, the network switch 109 may require validation of the client device 101 (for example, using a key, password, etc.) to provide that calls are not improperly routed.

Once the client device 101 has been configured to emulate a remote phone and registered with the network switch 109, the client device 101 may initiate and/or receive calls for the remote phone being emulated and process the calls at blocks 213 and 215. Moreover, the profile for the remote phone being emulated may be updated at the database at blocks 217 and 219. Updates may be initiated at block 217 periodically (e.g., at predetermined time intervals) and/or episodically (e.g., triggered when an element of the profile changes as a result of call activity). Moreover, updates may be initiated at the client device 101 and/or at the database 107. For example, the database 107 may periodically initiate profile updates at predetermined time intervals, and/or the client device may initiate profile updates when an element of the profile changes (such as when the call log changes in response to call activity).

Call processing and/or profile updates may continue at blocks 213, 215, 217, and/or 219 until emulation of the remote phone is to be terminated at block 221. Termination of emulation of the remote phone may be initiated by user input at the client device 101, by turning off the client device 101, by closing the soft phone application at the client device 101, etc.

Once emulation of the remote phone is to be terminated, registration of the emulation at the network switch 223 may be terminated at block 223, and the profile may be updated at the database 107 at block 225. More particularly, the client device 101 may transmit a termination request over the data network 103 to the network switch 109, and the network switch 109 may then route calls normally to the remote phone without routing calls to the client device 101. Before terminating registration of the client device 101 emulating a remote phone, the network switch 109 may require validation of the client device 101 (for example, using a key, password, etc.). The client device 101 may also perform one last update of the profile of the remote phone being emulated at the database 107 to provide that all communications activity of the client device 101 performed while emulating the remote phone is properly reflected in the profile for the remote phone.

Moreover, operations of FIG. 2 may be repeated by the same client device at different times to emulate different remote phones. Accordingly, the client device 101 may perform operations of blocks 201-225 at one time to emulate remote phone 105a, and the client device 101 may repeat operations of blocks 201-225 at a later time to emulate remote phone 105b.

Figure 3:
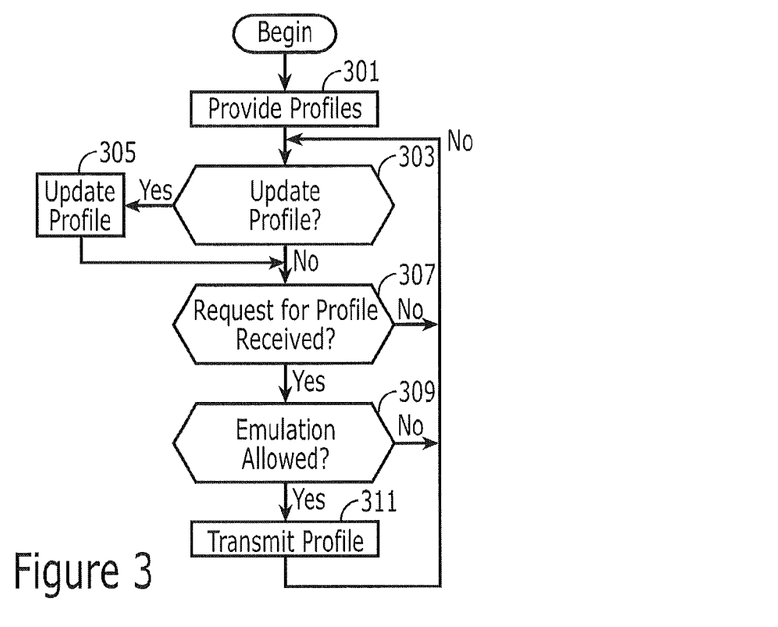

Operations of the database 107 will now be discussed with reference to the flowchart of FIG. 3. While two phones 105a-b associated with a single user (for example, the user's work and home phones) are illustrated in FIG. 1, any number of phones associated with any number of users may be supported by the database 107 and/or the network switch 109. The database 107 may thus maintain profiles for any number of phones associated therewith. Accordingly, the database 107 may provide a profile for each phone associated therewith at block 301.

A profile for a phone may first be provided at the database 107 when service for the phone is initiated, and the profile for each phone may be updated at blocks 303 and 305, for example, to reflect phone usage. Elements of a phone's profile may be updated to reflect changes in a call history log (resulting from phone calls to/from the phone), to reflect changes in contact information (such as telephone numbers entered/deleted by the phone user), to reflect changes in billing information (such as charges resulting from call activity), to reflect changes in voice mail associations (such as added/deleted voice mail messaged), etc. The profile maintained at the database 107 for each phone may be updated at blocks 303 and 305 periodically and/or episodically as elements of a phone's profile change. By way of example, the database 107 and/or the phones associated therewith may be configured to periodically update the respective profiles at set time intervals that may be different for different phones. In addition or in an alternative, a phone and/or the network switch 109 may be configured to initiate an update of a respective profile at the database 107 responsive to an event (such as processing a call, addition/deletion of a voice mail message, entry of new contact information, etc.)

As discussed above with respect to block 205 of FIG. 2, a client device (such as client device 101) may transmit a request for a profile of a remote phone (such as one of phones 105a-b) to be emulated over the data network 103 to the database 107. If such a request from a client device is received at the database 107 at block 307, the database 107 may determine at block 309 if the requesting client device is allowed to emulate the phone for which the profile has been requested. Before transmitting the profile, for example, the database 107 may require validation of the requesting client device (for example, using a key, password, etc.) to provide that the requested profile is not improperly distributed. If the requesting client device is allowed to emulate the phone for which the profile has been requested at block 309, the database 107 may transmit the profile of the phone to be emulated to the requesting client device at block 311. More particularly, the profile for the phone to be emulated may be transmitted over the data network 103 to the requesting client device. The profile may be received by the client device as discussed above with respect to block 207 of FIG. 2.

When a client device is emulating a remote phone, the profile of the remote phone may be updated at the database 107 at blocks 303 and 305 based on activity occurring at the client device. Profile updates based on activity occurring at the client device are also discussed above with respect to blocks 217 and 219 of FIG. 2. When the remote phone is not being emulated by a client device, the profile of the remote phone may be updated at the database 107 at blocks 303 and 305 based on activity occurring at the remote phone.

Figure 4:
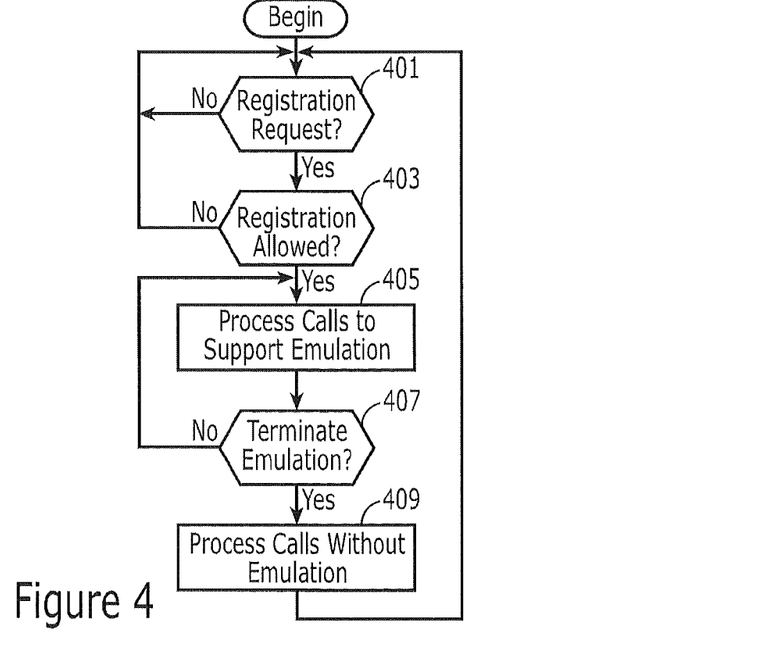

Operations of the network switch 109 will now be discussed with reference to the flow chart of FIG. 4. As discussed above, the network switch 109 routes calls (such as telephone calls) over the data network 103 to and from phones (such as phones 105a-b) supported by the telecommunications service provider operating the network switch 109. According to embodiments of the present invention, a properly registered client device 101 may be allowed to emulate a phone (such as one of phones 105a-b) associated with a user of the client device so that the network switch 109 routes calls to/from the client device 101 that would otherwise be routed to/from the phone being emulated.

As discussed above, a client device 101 may register with the network switch 109 at block 211 of FIG. 2. If such a request for registration is received at the network switch 109 at block 401 of FIG. 4, the network switch 109 may determine if the requested registration is allowed for the client device 101 at block 403. More particularly, the network switch 109 may require validation of the client device 101 (for example, using a key, password, etc.) to provide that calls are not improperly routed. Once the client device 101 has been registered with the network switch 109, the network switch may process calls to support emulation at block 405 until emulation for the client device 101 is terminated at block 407, as discussed above with respect to blocks 213 and 215 of FIG. 2. More particularly, the network switch 109 may route calls relating to the remote phone being emulated to/from the client device 101.

Once emulation of the remote phone is to be terminated, registration of the client device 101 at the network switch 109 may be terminated at block 407. More particularly, the client device 101 may transmit a termination request over the data network 103 to the network switch 109, and the network switch 109 may then route calls normally to the remote phone without routing calls to the client device 101 at block 409. Before terminating registration of the client device 101 emulating a remote phone, the network switch 109 may require validation of the client device 101 (for example, using a key, password, etc.).

When the client device 101 is registered with the network switch 109 as emulating a remote phone, the network switch 109 may process calls to support emulation at block 405 by routing calls addressed to the emulated phone to the client device only. In an alternative, the network switch 109 may process calls to support emulation at block 405 by routing calls addressed to the emulated phone to the client device and to the remote phone.

As used herein the term telephone or phone may be any voice communications device such as a dedicated Voice over Internet Protocol (VoIP) phone, a general purpose computing device providing VoIP functionality, a mobile telephone, a conventional wired PSTN telephone, etc.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of emulating a remote telephone at a client device, the method comprising:
    identifying the remote telephone at the client device;
    transmitting a request for a profile of the remote telephone from the client device;
    receiving the profile of the remote telephone at the client device;
    after receiving the profile, configuring the client device according to the profile of the remote telephone; and
    after configuring the client device according to the profile of the remote telephone, receiving a telephone communication at the client device wherein the telephone communication is addressed to the remote telephone,
    wherein the profile of the remote telephone includes a telephone number of the remote telephone; and
    wherein the profile of the remote telephone includes a call history log for the remote telephone, contact information for the remote telephone, a voice mail association for the remote telephone, and billing information for the remote telephone.

2. A method according to claim 1 wherein transmitting the request for a profile comprises transmitting the request over a data network, and wherein receiving the profile comprises receiving the data profile over the data network.

3. A method according to claim 2 wherein the data network comprises an Internet Protocol connectivity network.

4. A method according to claim 2 further comprising:
    after receiving the profile and before receiving the telephone communication addressed to the remote telephone, registering with a telephone network switch to receive and transmit calls according to the profile of the remote telephone.

5. A method according to claim 4 wherein registering with the telephone network switch comprises registering with the telephone network switch over the data network.

6. A method according to claim 4 wherein the telephone network switch comprises an Internet Protocol Multimedia Subsystem telephone network switch.

7. A method according to claim 4 further comprising:
    after registering with the telephone network switch, transmitting a request to terminate registration with the telephone network switch.

8. A method according to claim 1 wherein the remote telephone comprises a first remote telephone, the method further comprising:
    after receiving the telephone communication addressed to the first remote telephone, accepting identification of a second remote telephone at the client device wherein the first and second remote telephones are different;
    transmitting a request for a second profile of the second remote telephone;
    receiving the second profile of the second remote telephone;
    after receiving the second profile, configuring the client device according to the second profile of the second remote telephone; and
    after configuring the client device according to the second profile of the second remote telephone, receiving a second telephone communication at the client device wherein the second telephone communication is addressed to the second remote telephone.

9. A method of retrieving information in a telecommunications network at a trusted entity, the method comprising:
    receiving a data request for an information segment including personal information associated with a user, the data request being made by way of a secure identification element that is uniquely associated with the user and allows access to the personal information of the user stored at the trusted entity, wherein the secure identification element does not include a Social Security Number of the user;
    authenticating the data request;
    processing the data request for the information segment via a mapping agent configured to map the secure identification element to the information segment including the personal information of the user,
    after configuring the client device the profile, receiving revised profile information for the profile of the remote telephone at the client device, wherein the revised profile information is different than profile information received with the profile of the remote telephone; and
    after receiving the revised profile information, configuring the client device according to the received revised profile information of the remote telephone.

10. A method according to claim 9 wherein the revised profile information includes a revised call history log, revised contact information, a revised voice mail association, and revised billing information.

11. A method of maintaining a profile for a telephone to support emulation of the telephone at a client device remote from the telephone, the method comprising:
    providing the profile for the telephone at a database separate from the telephone and separate from the client device;
    updating the profile for the telephone at the database responsive to activity at the telephone;
    receiving a request for the profile for the telephone from the client device;
    after receiving the request, transmitting the profile for the telephone to the client device, such that the client device can be configured according to the profile of the telephone; and
    after transmitting the profile for the telephone to the client device, updating the profile for the telephone at the database responsive to activity at the client device,
    wherein updating the profile for the telephone at the database responsive to activity at the client device includes receiving revised profile information from the client device.

12. A method according to claim 11 wherein the revised profile information includes a revised call history log, revised contact information, a revised voice mail association, and revised billing information.

13. A method according to claim 11 wherein the profile of the remote telephone includes a telephone number of the telephone.

14. A method according to claim 13 wherein the profile of the telephone includes a call history log for the telephone, contact information for the telephone, a voice mail association for the telephone, and billing information for the telephone.

15. A method according to claim 11 wherein receiving the request for the profile comprises receiving the request over a data network, and wherein transmitting the profile comprises transmitting the data profile over the data network.

16. A method according to claim 15 wherein the data network comprises an Internet Protocol connectivity network.

17. A method according to claim 11 wherein updating the profile for the telephone at the database responsive to activity at the telephone comprises updating the profile for the telephone at the database responsive to activity at the telephone before and after updating the profile for the telephone at the database responsive to activity at the client device.

* * * * *